United States Patent [19]

Tarrant

[11] Patent Number: 4,507,883

[45] Date of Patent: Apr. 2, 1985

[54] THREE PART DISKETTE LABELING SYSTEM

[76] Inventor: Thomas G. Tarrant, P.O. Box 199, Hunt, Tex. 78024

[21] Appl. No.: 458,778

[22] Filed: Jan. 18, 1983

[51] Int. Cl.³ .............................................. A44C 3/00
[52] U.S. Cl. ...................................... 40/2 R; 40/359
[58] Field of Search ................. 40/2 R, 312, 359, 360, 40/10 R, 625, 626, 627; 206/444, 312, 313, 309; 283/98

[56] References Cited

U.S. PATENT DOCUMENTS 3,537,195  11/1970  Gerds ..................................... 283/98
4,328,978  5/1982  McLaughlin .......................... 40/627

FOREIGN PATENT DOCUMENTS 56685  7/1982  European Pat. Off. ............... 40/359

*Primary Examiner*—Robert P. Swiatek
*Assistant Examiner*—Cary E. Stone
*Attorney, Agent, or Firm*—Harvey B. Jacobson; Clarence A. O'Brien

[57] ABSTRACT

A three part diskette labeling system where two parts are pressure-sensitive conventional labels with identical indicia on each part with part one appearing on the non-removable protective carrier of a floppy disc or diskette and the second label part appearing on the storage envelope for the diskette in order to link the diskette to its corresponding envelope which becomes the third part of the labeling system and contains the more lengthy labeling descriptions relating to the data recorded on the diskette. The arrangement of the first two parts of the label is such that when the carrier for the diskette is slid into its storage envelope, the first two parts of the label come into a juxtaposed relationship in registry with each other in order to enable the indicia thereon to be readily observed and compared. This will enable a user to quickly and easily determine that the carrier and diskette therein have been inserted into the correct corresponding storage envelope so that the third part of the system, the indicia on the envelope, properly corresponds to what is recorded on the diskette. The indicia on the first two parts of the labeling system may be widely spaced horizontally arranged numerals, alphabetic letters, different colors, or combinations of indicia or distinguishing characteristics provided on the first two parts of the label which enable easy comparison of the two parts of the label and form a visual link between diskette and storage envelope.

2 Claims, 3 Drawing Figures

THREE PART DISKETTE LABELING SYSTEM

BACKGROUND OF THE INVENTION

1. Field of the Invention

The present invention generally relates to a two part label having corresponding indicia thereon with the two parts of the label being placed on, incorporated into or otherwise associated with two items, components or articles which are to be associated with each other during a portion of their use cylce so that a determination may be quickly made as to whether the items, components or articles have been properly associated. More specifically, the invention relates to a two part label in which one part is associated with the protective carrier or sleeve of a floppy disc or diskette and its non-removable recorded media contained therein, and the second part of the label is associated with the proper storage envelope for that individual diskette, and which under this novel labeling system, may safely contain the index of contents thereon, with the two parts of the label including identical indicia oriented in registry with each other when the carrier has been inserted into the storage envelope so that a user may readily determine that the corresponding diskette along with its protective carrier has been inserted into the proper storage envelope bearing the handwritten index of contents recorded on the diskette, thereby facilitating retrieval of such information even while the diskette is unavailable inside the disk drive (not possible with conventional style labeling on the diskette protective carrier) and also allowing more space for entering handwritten information than is possible on the limited space allowed on the diskette carrier itself, where part one of the two part label is attached.

2. Description of the Prior Art

Various types of imprinted labels are available and have been used for various purposes to identify various items with such labels normally employing some type of indicia compatible with a predetermined system of identification. Also, it is known to provide multiple labels with corresponding indicia to be placed on separate items to indicate that such items should be associated with each other. The following U.S. patents are exemplary of developments in this field of endeavor:

U.S. Pat. Nos. 1,474,663, 11/20/23; 2,100,840, 11/30/37; 2,828,567, 04/01/58; 3,500,364, 03/10/70; 3,956,264, 04/20/76.

SUMMARY OF THE INVENTION

In present day information storage and retrieval systems, information is recorded on flexible discs such as "floppy" discs, diskettes and the like which are mounted in a protective carrier with each diskette having a plurality of tracks on which information is magnetically recorded and a label with content indicia is placed on the protective carrier. The protective carrier with the diskette therein is placed in a storage envelope which has a short front wall so that the label on the upper edge portion of the protective carrier is visible. The storage envelope is seldom provided with identifying indicia relating to the information on the diskette or with indicia relating to any indicia that may be provided on the protective carrier to indicate the information recorded on the diskette in that envelope. One of the problems which has occurred is the placement of a floppy disc or diskette and its associated non-removable protective carrier into a storage envelope which has information thereon relating to the contents of the diskette that does not correspond to the recorded information on that diskette due to the fact that the wrong diskette was placed in that storage envelope.

Accordingly, it is an object of the present invention to provide a three part diskette labeling system for linking the diskette to its corresponding envelope so that the information on the envelope indicating the content of the material recorded on the diskette corresponds with the material that is actually on the diskette.

Another object of the invention is to provide a labeling system having a two part label with each label including corresponding indicia such as numerical indicia, alphabetic indicia or other recognizable and distinguishable indicia including but not limited to surface ornamentation, color distinction, geometrical configurations and the like and the envelope including an index of contents below the top edge of the drop front to form the third part of the label.

A further object of the invention is to provide a two part label in accordance with the preceding objects in which each part of the label is provided with indicia such as serial numbers or the like with wide spacing between the indicia and graphic separating design being optionally provided between the indicia for easier recognition of unlike or unequal indicia with the two parts of the label being associated with the protective carrier and the storage envelope in such a manner that the two parts of the label will be in adjacent registry when the protective carrier has been completely inserted into the storage envelope thereby further enabling easier recognition of unlike or unequal indicia.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
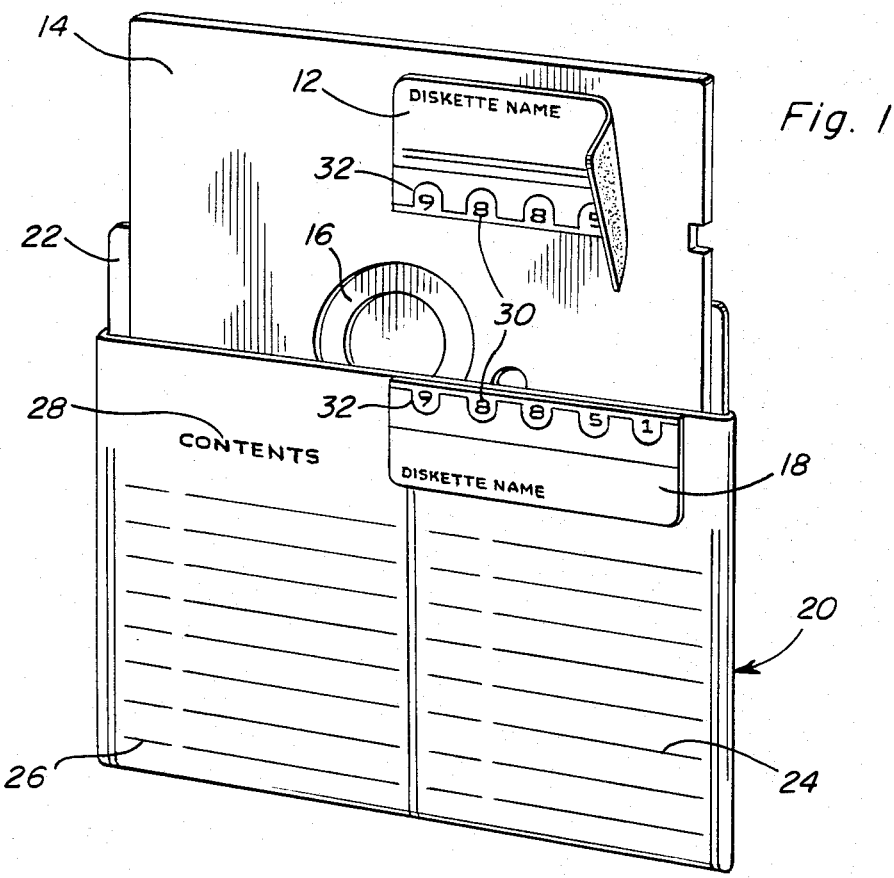
FIG. 1 is a perspective view of a diskette and non-removable protective carrier partially inserted into a storage envelope illustrating the orientation of the two parts of the label of the present invention incorporated thereon.
Figure 3:
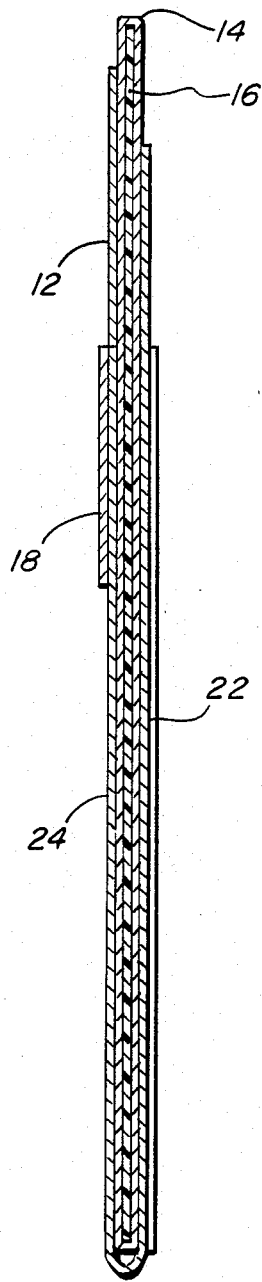
FIG. 3 is a vertical sectional view taken substantially upon a plane passing along line 3—3 of FIG. 2 illustrating the orientation of the components of the label parts on the surface of the protective carrier and the surface of the storage envelope.

Referring now specifically to the drawings, the three part label system of this invention includes a two part label generally designated by numeral 10 which includes one label part 12 mounted on, associated with, incorporated into or otherwise appearing on the non-removable protective carrier 14 of a floppy disc or diskette 16 which is of conventional and commercially available construction except for the label part 12. The two part label 10 also includes a second label part 18 mounted on, associated with, incorporated into or otherwise appearing on the surface of a storage envelope 20 which is of conventional construction and commercially available except for the label part 18 and indicia relating to the recorded material. The storage envelope 20 includes a rear panel 22 which is vertically higher than a front panel 24 and the front panel 24 includes a plurality of vertically spaced horizontal lines 26 to receive indicia indicating the material recorded on the diskette 16 in the protective carrier 14 placed therein with descriptive indicia 28 relating to the information to be recorded on the horizontal lines 26. When the protective carrier 14 is completely inserted into the storage envelope 20, the upper edge thereof will project above the upper edge of the rear panel 22 to facilitate insertion and removal thereof so that the protective carrier 14 along with the disc or diskette 16 may be easily removed from or inserted into the storage envelope 20 in a conventional and well known manner.

Figure 2:
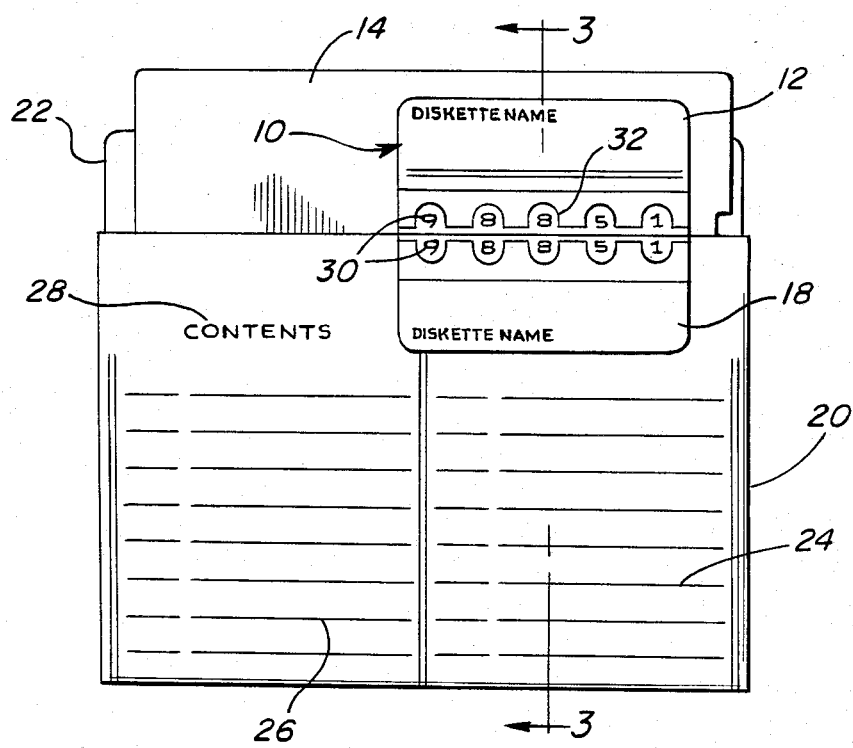
FIG. 2 is a plan view of the assembly of FIG. 1 in which the protective carrier with diskette therein has been completely inserted into the storage envelope and illustrating the manner in which the indicia on the two parts of the label register for easy comparison.

Each of the label parts 12 and 18 may be of generally rectangular configuration with the upper edge of the label part 18 on the front panel 14 of the envelope 20 corresponding with, in registry with or closely adjacent the upper edge of the front panel 24. Also, the label part 12 is positioned on the protective carrier 14 in such a relationship that when the protective carrier 14 is completely inserted into the storage envelope 20 the lower edge of the label part 12 will be in registry with or closely adjacent the upper edge of the label part 18 as illustrated in FIG. 2. The two parts of the label may be provided with a pressure-sensitive adhesive backing for attachment to the protective carrier 14 and the front panel 24 respectively or any other structure may be provided for securing the label parts 12 and 18 onto the protective carrier 14 and envelope 20. Also, it is within the purview of the present invention to actually incorporate the label parts 12 and 18 into printed material which may be placed on the protective carrier 14 or the front panel 24 of the storage envelope 20 so that permanent label parts 12 and 18 are provided.

Each label part is provided with spaced identifying indicia 30 thereon with the indicia on the label part 12 being along the bottom edge thereof and the indicia on the label part 18 being along the top edge thereof so that when the label parts 12 and 18 are in juxtaposed or registered adjacent relation, the indicia 30 on the two parts of the label will be in registry with each other and closely related to each other to enable easy comparison of the indicia. The indicia 30 may be numerical as illustrated or alphabetic or any other distinguishing indicia that is easily recognizable so that unlike indicia or unequal indicia may be easily recognized so that it can be easily determined whether an improper diskette 16 and protective carrier 14 has been placed in an envelope 20 since, in that event, the indicia 30 on the label part 12 will not match, correspond with or be identical to the indicia 30 on the label part 18. As illustrated, the indicia 30 formed by numerals is widely spaced with portions of the label parts positioned therebetween and a graphic design 32 is provided between and partially around the indicia to more readily enable visual observation of the indicia and provide a separation between adjacent indicia numerals, letters and the like to enhance the recognition of the indicia and more easily enable recognition of identical indicia or non-identical indicia. The graphic design 32 may take various forms such as a chain link arrangement or any other graphic design which facilitates a separation of the indicia. Also, each label part 12 and 18 is provided with an area that can receive additional information with respect to the information recorded on the diskette 16 placed in the protective carrier 14. The specific dimensional characteristics and shape and configuration of the label parts may vary and the indicia thereon may vary and be adapted to the particular requirements relating to specific uses of the diskette 16, the protective carrier 14 and the envelope 20 in order to facilitate retrieval of the information magnetically recorded on the various tracks on the disc or diskette 16.

The label usually provided on conventional protective carriers is inadequate in size to enable adequate descriptive material relating to the recorded material to be placed thereon. The usually provided label is often renewed by applying new labels in place of old ones when additional descriptive room is required. In the present invention, the information receiving area is extended to the surface of the storage envelope which enables this information to be referenced when the diskette and the protective carrier are in the disk drive. This expanded labeling area, on the surface or surfaces of the storage envelope, can be used to write or cross out information until both sides of the envelope have been used and indicia even may be erased therefrom although care must be exercised that erasing and writing are not done when the carrier and diskette are in the envelope (erasing is not ever recommended on conventional labeling attached to the disk protective carrier, for fear of damaging the contents beneath the area being rubbed). The two label parts 12 and 18 effectively link the diskette to the third label part formed by the indicia receiving area of the surfaces (front and back) of the envelope.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a flexible diskette having information magnetically recorded thereon in a plurality of tracks, a non-removable protective carrier enclosing the diskette but enabling the information thereon to be recorded and retrieved, a storage envelope for the protective carrier and diskette therein, that improvement comprising a three part labeling system including a two part label comprising a first label part mounted on the front panel of the storage envelope adjacent the upper edge thereof and a second label part mounted on the protective carrier adjacent to but above the upper edge of the front panel of the storage envelope and in alignment with and in registry with said first label part mounted on the envelope when the protective carrier is completely inserted into the envelope with a portion of the protective carrier projecting above the upper edge of the front panel of the envelope, each label part including indicia, the label part on the envelope having the indicia along the upper edge of the label part and the label part on the protective carrier having the indicia along the lower edge of the label part and adjacent to and in registry with the indicia on the label part on the envelope when the protective carrier is inserted into the envelope, said storage envelope having indicia thereon spaced from the second label part and relating to the information recorded on the diskette with the indicia on the envelope forming a third label part.

2. The combination as defined in claim 1 wherein said indicia on the first and second label parts is a series of widely spaced numerals and a graphic separating line extending between adjacent numerals and including semi-circular portions extending around that portion of the numerals remote from the edge of the label part, said first and second label parts being adhesively secured to the carrier and envelope, respectively, and all of said label parts including write-on surface areas.

* * * * *